(12) United States Patent
Schwarz et al.

(10) Patent No.: US 10,599,251 B2
(45) Date of Patent: Mar. 24, 2020

(54) METHOD AND APPARATUS FOR DIFFERENTIATING TOUCH SCREEN USERS BASED ON TOUCH EVENT ANALYSIS

(71) Applicant: QEEXO, CO., Mountain View, CA (US)

(72) Inventors: Julia Schwarz, Pittsburgh, PA (US); Chris Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 8 days.

(21) Appl. No.: 15/075,648

(22) Filed: Mar. 21, 2016

(65) Prior Publication Data

US 2017/0024055 A1 Jan. 26, 2017

Related U.S. Application Data

(63) Continuation of application No. 14/483,150, filed on Sep. 11, 2014, now Pat. No. 9,329,715.

(51) Int. Cl.
*G06F 3/041* (2006.01)
*G06F 3/043* (2006.01)

(52) U.S. Cl.
CPC ............ *G06F 3/0416* (2013.01); *G06F 3/041* (2013.01); *G06F 3/043* (2013.01); *G06F 2203/04105* (2013.01)

(58) Field of Classification Search
CPC ...... G06F 3/0416; G06F 3/043; G06F 3/0488; G06F 2203/04104; G06F 21/32; G06F 3/0433; G06F 3/017; H04M 2250/12; G06K 9/0061; G06K 9/6267
See application file for complete search history.

(56) References Cited

U.S. PATENT DOCUMENTS

| | | | |
|---|---|---|---|
| 2,008,028 | A | 7/1935 | Mccortney et al. |
| 2,430,005 | A | 11/1947 | Denneen et al. |
| 3,354,531 | A | 11/1967 | Pryor |

(Continued)

FOREIGN PATENT DOCUMENTS

| | | |
|---|---|---|
| CN | 1797305 A | 7/2006 |
| CN | 1928781 A | 3/2007 |

(Continued)

OTHER PUBLICATIONS

Sarah, M. K. et aL, "A Personal Touch—Recognizing Users Based on Touch Screen Behavior," PhoneSense'12, Nov. 6, 2012, Toronto, ON, Canada, Nov. 6, 2012, pp. 5.

(Continued)

*Primary Examiner* — Gerald Johnson
(74) *Attorney, Agent, or Firm* — Kwan & Olynick LLP (57) ABSTRACT

Some embodiments of the present invention include a method of differentiating touch screen users based on characterization of features derived from the touch event acoustics and mechanical impact and includes detecting a touch event on a touch sensitive surface, generating a vibroacoustic waveform signal using at least one sensor detecting such touch event, converting the waveform signal into at least a domain signal, extracting distinguishing features from said domain signal, and classifying said features to associate the features of the domain signal with a particular user.

29 Claims, 4 Drawing Sheets

(56) References Cited

U.S. PATENT DOCUMENTS

| | | |
|---|---|---|
| 4,561,105 A | 12/1985 | Crane et al. |
| 4,597,932 A | 7/1986 | Kurihara et al. |
| 4,686,332 A | 8/1987 | Greanias et al. |
| 5,483,261 A | 1/1996 | Yasutake |
| 5,544,265 A | 8/1996 | Bozinovic et al. |
| 5,596,656 A | 1/1997 | Goldberg |
| 5,615,285 A | 3/1997 | Beemink |
| 5,625,818 A | 4/1997 | Zarmer et al. |
| 5,666,438 A | 9/1997 | Beemink et al. |
| 5,867,163 A | 2/1999 | Kurtenbach |
| 5,933,514 A | 8/1999 | Ostrem et al. |
| 6,028,593 A | 2/2000 | Rosenberg et al. |
| 6,118,435 A | 9/2000 | Fujita et al. |
| 6,208,330 B1 | 3/2001 | Hasegawa et al. |
| 6,212,295 B1 | 4/2001 | Ostrem et al. |
| 6,222,465 B1 | 4/2001 | Kumar et al. |
| 6,246,395 B1 | 6/2001 | Goyins et al. |
| 6,252,563 B1 | 6/2001 | Tada et al. |
| 6,323,846 B1 | 11/2001 | Westerman et al. |
| 6,337,698 B1 | 1/2002 | Kelly, Jr. et al. |
| 6,492,979 B1 | 12/2002 | Kent et al. |
| 6,504,530 B1 | 1/2003 | Wilson et al. |
| 6,643,663 B1 | 11/2003 | Dabney et al. |
| 6,707,451 B1 | 3/2004 | Nagaoka |
| 6,748,425 B1 | 6/2004 | Duffy et al. |
| 6,772,396 B1 | 8/2004 | Cronin et al. |
| 6,933,930 B2 | 8/2005 | Devige et al. |
| 6,943,665 B2 | 9/2005 | Chornenky |
| 7,050,955 B1 | 5/2006 | Carmel et al. |
| 7,084,884 B1 | 8/2006 | Nelson et al. |
| 7,098,896 B2 | 8/2006 | Kushler et al. |
| 7,212,197 B1 | 5/2007 | Schkolne et al. |
| 7,443,396 B2 | 10/2008 | Ilic |
| 7,581,194 B2 | 8/2009 | Iwema et al. |
| 7,982,724 B2 | 7/2011 | Hill |
| 8,086,971 B2 | 12/2011 | Radivojevic et al. |
| 8,144,126 B2 | 3/2012 | Wright |
| 8,154,524 B2 | 4/2012 | Wilson et al. |
| 8,154,529 B2 | 4/2012 | Sleeman et al. |
| 8,170,346 B2 | 5/2012 | Ludwig |
| 8,199,126 B1 | 6/2012 | Taubman |
| 8,253,744 B2 | 8/2012 | Macura et al. |
| 8,269,744 B2 | 9/2012 | Agari et al. |
| 8,327,029 B1 | 12/2012 | Purser |
| 8,441,790 B2 | 5/2013 | Pance et al. |
| 8,547,357 B2 | 10/2013 | Aoyagi |
| 8,624,878 B2 | 1/2014 | Sarwar et al. |
| 8,670,632 B2 | 3/2014 | Wilson |
| 8,674,943 B2 | 3/2014 | Westerman et al. |
| 8,743,091 B2 | 6/2014 | Bernstein |
| 8,760,395 B2 | 6/2014 | Kim et al. |
| 8,762,332 B2 | 6/2014 | Keebler et al. |
| 8,769,524 B2 | 7/2014 | Bhullar et al. |
| 9,013,452 B2 | 4/2015 | Harrison et al. |
| 9,019,244 B2 | 4/2015 | Harrison |
| 9,030,498 B2 | 5/2015 | Galor et al. |
| 9,052,772 B2 | 6/2015 | West |
| 9,060,007 B2 | 6/2015 | Keebler et al. |
| 9,182,882 B2 | 11/2015 | Fowler et al. |
| 9,329,688 B2 | 5/2016 | Harrison |
| 9,329,715 B2 | 5/2016 | Schwarz et al. |
| 9,377,863 B2 | 6/2016 | Bychkov et al. |
| 9,557,852 B2 | 1/2017 | Tsai et al. |
| 9,612,689 B2 | 4/2017 | Harrison et al. |
| 9,696,859 B1 | 7/2017 | Heller et al. |
| 9,864,453 B2 | 1/2018 | Munemoto et al. |
| 10,082,935 B2 | 9/2018 | Harrison et al. |
| 2002/0009227 A1 | 1/2002 | Goldberg et al. |
| 2002/0057837 A1 | 5/2002 | Wilkinson et al. |
| 2002/0070927 A1 | 6/2002 | Fujitsuka et al. |
| 2002/0126161 A1 | 9/2002 | Kuzunuki et al. |
| 2003/0048260 A1 | 3/2003 | Matusis |
| 2003/0110085 A1 | 6/2003 | Murren et al. |
| 2003/0132922 A1 | 7/2003 | Phillip |
| 2003/0217873 A1 | 11/2003 | Paradiso et al. |
| 2004/0012573 A1 | 1/2004 | Morrison et al. |
| 2004/0021681 A1 | 2/2004 | Liao |
| 2004/0054711 A1 | 3/2004 | Multer |
| 2004/0141010 A1 | 7/2004 | Fitzmaurice et al. |
| 2004/0160421 A1 | 8/2004 | Sullivan |
| 2004/0199867 A1 | 10/2004 | Brandenborg |
| 2004/0225730 A1 | 11/2004 | Brown et al. |
| 2005/0083313 A1 | 4/2005 | Hardie-Bick |
| 2005/0131778 A1 | 6/2005 | Bennett et al. |
| 2005/0146512 A1 | 7/2005 | Hill et al. |
| 2005/0289461 A1 | 12/2005 | Amado et al. |
| 2006/0010400 A1 | 1/2006 | Dehlin et al. |
| 2006/0026535 A1 | 2/2006 | Hotelling et al. |
| 2006/0031746 A1 | 2/2006 | Toepfer et al. |
| 2006/0152499 A1 | 7/2006 | Roberts |
| 2006/0173985 A1 | 8/2006 | Moore |
| 2006/0184617 A1 | 8/2006 | Nicholas et al. |
| 2006/0217126 A1 | 9/2006 | Sohm et al. |
| 2006/0230021 A1 | 10/2006 | Diab et al. |
| 2006/0288329 A1 | 12/2006 | Gandhi et al. |
| 2007/0011205 A1 | 1/2007 | Majjasie et al. |
| 2007/0044010 A1 | 2/2007 | Sull et al. |
| 2007/0075965 A1 | 4/2007 | Huppi et al. |
| 2007/0085157 A1 | 4/2007 | Fadell et al. |
| 2007/0100959 A1 | 5/2007 | Eichstaedt et al. |
| 2007/0109279 A1 | 5/2007 | Sigona |
| 2007/0126716 A1 | 6/2007 | Haverty |
| 2007/0168367 A1 | 7/2007 | Dickinson et al. |
| 2007/0186157 A1 | 8/2007 | Walker et al. |
| 2007/0192674 A1 | 8/2007 | Bodin et al. |
| 2007/0245020 A1 | 10/2007 | Ott, IV |
| 2007/0257767 A1 | 11/2007 | Beeson |
| 2007/0291297 A1 | 12/2007 | Harmon et al. |
| 2008/0005666 A1 | 1/2008 | Sefton et al. |
| 2008/0036743 A1 | 2/2008 | Westerman et al. |
| 2008/0042978 A1 | 2/2008 | Perez-Noguera |
| 2008/0082941 A1 | 4/2008 | Goldberg et al. |
| 2008/0103906 A1 | 5/2008 | Singh |
| 2008/0117168 A1 | 5/2008 | Liu et al. |
| 2008/0126388 A1 | 5/2008 | Naaman |
| 2008/0141132 A1 | 6/2008 | Tsai |
| 2008/0155118 A1 | 6/2008 | Glaser et al. |
| 2008/0158147 A1 | 7/2008 | Westerman et al. |
| 2008/0158168 A1 | 7/2008 | Westerman et al. |
| 2008/0158185 A1 | 7/2008 | Westerman |
| 2008/0168403 A1 | 7/2008 | Westerman et al. |
| 2008/0180406 A1 | 7/2008 | Han et al. |
| 2008/0244468 A1 | 10/2008 | Nishihara et al. |
| 2008/0288347 A1 | 11/2008 | Sifry |
| 2008/0319932 A1 | 12/2008 | Yih et al. |
| 2009/0025987 A1 | 1/2009 | Perksi et al. |
| 2009/0073144 A1 | 3/2009 | Chen et al. |
| 2009/0095540 A1 | 4/2009 | Zachut et al. |
| 2009/0150373 A1 | 6/2009 | Davis et al. |
| 2009/0157206 A1 | 6/2009 | Weinberg et al. |
| 2009/0174679 A1 | 7/2009 | Westerman |
| 2009/0178011 A1 | 7/2009 | Ording et al. |
| 2009/0231275 A1 | 9/2009 | Odgers |
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0315835 A1 | 12/2009 | De Goes et al. |
| 2009/0318192 A1 | 12/2009 | Leblanc et al. |
| 2010/0036967 A1 | 2/2010 | Caine et al. |
| 2010/0060602 A1 | 3/2010 | Agari et al. |
| 2010/0085216 A1 | 4/2010 | Ms |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |

(56) References Cited

U.S. PATENT DOCUMENTS

| | | |
|---|---|---|
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1* | 1/2011 | Kondo .................. G06F 3/0433 345/173 |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1* | 1/2012 | Li .......................... G01S 7/5273 345/177 |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |

(56) References Cited

FOREIGN PATENT DOCUMENTS

| | | |
|---|---|---|
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94-04992 A1 | 3/1994 |
| WO | 2006/070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012166277 | 12/2012 |
| WO | 2013/059488 A1 | 4/2013 |
| WO | WO-2013059488 A1 * | 4/2013 ........... G06F 3/0416 |
| WO | 2013/061998 A1 | 5/2013 |
| WO | 2014/037951 A1 | 3/2014 |
| WO | 2014/182435 A1 | 11/2014 |

OTHER PUBLICATIONS

Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages.
Chinese Office Action for Chinese Patent Application No. 201280062500.7, dated Apr. 27, 2018, 19 pages.
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.

(56) References Cited

OTHER PUBLICATIONS

U.S. Appl. No. 14/492,604, filed Sep. 22, 2014, titled: "Method and Apparatus for Improving Accuracy of Touch Screen Event Analysis by Use of Edge Classification." 35 pages.
U.S. Appl. No. 14/495,041, filed Sep. 24, 2014, titled: "Method for Improving Accuracy of Touch Screen Event Analysis by Use of Spatiotemporal Touch Patterns." 34 pages.
U.S. Appl. No. 14/483,150, filed Sep. 11, 2014, titled: "Method and Apparatus for Differentiating Touch Screen Users Based on Touch Event Analysis." 38 pages.
U.S. Appl. No. 14/242,127, filed Apr. 1, 2014, titled: Method and Apparatus for Classifying DTouch Events on a Touch Sensitive Surface, 36 pages.
U.S. Appl. No. 13/849,698, filed Mar. 23, 2013, titled: "Method and System for Activating Different Interactive Functions Using Different Types of Finger Contacts." 52 pages.
U.S. Appl. No. 13/780,494, filed Feb. 28, 2013, titled: "Input Tools Having Viobro-Acoustically Distinct Regions and Computing Device for Use With the Same." 34 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9,2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et aL, "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 for European Patent Application No. 14785422.8, 7 pages.
Communication pursuant to Article 94(3) EPC dated Mar. 5, 2018 for European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages. (with Translation).
Chinese Office Action dated Feb. 9, 2018 for Chinese Patent Application No. 201480022056.5, 19 pages. (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.

(56) References Cited

OTHER PUBLICATIONS

Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Office Action dated Jul. 5, 2019 for U.S. Appl. No. 15/836,798, 95 pages.
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800 filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture ofVibro-Acoustic Data Used to Determine Touch Types.".
U.S. Appl. No. 14/191,329, filed Feb. 26, 2014, titled: "Using Capacitive Images for Touch Type Classification.".
U.S. Appl. No. 13/887,711, filed May 6, 2013, titled: "Using Finger Touch Types to Interact with Electronic Devices.".
Non-Final Office Action received for U.S. Appl. No. 14/242,127 dated Jun. 2, 2015, 33 pages.
Final Office Action received for U.S. Appl. No. 14/242,127 dated Sepetmber 18, 2015, 28 pages.

(56) References Cited

OTHER PUBLICATIONS

Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, 2, 1998 pp. 121-167.
Cao et al., "ShapeTouch: Leveraging Contact Shape on Interactive Surfaces", IEEE International Workshop on Horizontal Interactive Human Computer System (TABLETOP), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations, vol. 11, No. 1, 2009, pp. 10-18.
Harrison et al., Skinput: Appropriating the Body as an Input Surface, Proceedings of CHI, Apr. 10-15, 2010, pp. 453-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.
Hinckley et al., "Sensor Synaesthesia: Touch in Motion, and Motion in Touch", Proceedings of CHI, 2011, pp. 801-810.
Hinckley et al., "Pen+ Touch= New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEl, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com, retrieved Jul. 8, 2019, 8 pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso et al., "Sensor Systems for Interactive Surfaces", IBM Systems Journal, vol. 39 No. 3&4, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 on Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 16, 2017, 5 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.

\* cited by examiner

METHOD AND APPARATUS FOR DIFFERENTIATING TOUCH SCREEN USERS BASED ON TOUCH EVENT ANALYSIS

CROSS-REFERENCE TO RELATED APPLICATIONS

This application is a continuation of and claims benefit under 35 U.S.C. § 120 to U.S. application No. 14/483,150, filed Sep. 11, 2014 by Julia Schwarz et al., now U.S. Pat. No. 9,329,715, issued May 3, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to the analysis of touch screen mechanical impact features and acoustic features to differentiate between different users.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Various electronic devices today are typically operated by a user interacting with a touch screen. Some such devices, such as touch sensitive computer screens, are designed to be operated by multiple users, normally at different times. Other such devices, such as smart phones, are usually associated with a single user whose privacy could be seriously jeopardized if another user gains unauthorized access to such one-user devices.

With multiple user devices, it is usually necessary to provide an input to the computer to identify the particular user who is operating the system so that appropriate user-related programs are presented for further processing by the correct user.

With single user devices, exposure of detailed information to an unauthorized user would exacerbate the injury to privacy of the authorized user and therefore passwords, fingerprint readers and entry codes are often used to prevent access to the unauthorized user.

Unfortunately, such user ID inputs, passwords, fingerprint reading, entry codes and other such extra ID or security operations, are time-consuming and inconvenient and detract from the pleasure and efficiencies of using such devices.

BRIEF SUMMARY

For some embodiments, methods for differentiating touch screen users includes detecting a touch event from at least one user, generating a vibro-acoustic waveform signal associated with the touch event, converting the vibro-acoustic waveform signal into at least one converted waveform signal different from the vibro-acoustic wave form signal, extracting distinguishing features from the converted waveform signal, and using the extracted distinguishing features to associate the touch event with a particular user.

For some embodiments, apparatus for differentiating touch screen users include a touch sensitive surface configured for detecting a touch event from at least one user, a sensor configured to generate a vibro-acoustic waveform signal in response to occurrence of the touch event, a converter configured to convert the waveform signal into at least one converted wave form signal different from the vibro-acoustic waveform signal, a feature extractor configured for extracting distinguishing features from the converted waveform signal, and a classification unit configured to use the distinguishing features extracted by the extractor to associate the vibro-acoustic waveform signal with a particular user.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include methods of differentiating touch screen users based on characterization of features derived from the touch event acoustics and mechanical impact and includes detecting a touch event on a touch sensitive surface, generating a vibro-acoustic waveform signal using at least one sensor detecting such touch event, converting the waveform signal into at least a domain signal, extracting distinguishing features from said domain signal, and classifying said features to associate the features of the domain signal with a particular user.

The disclosed embodiments may include systems to differentiate touch screen users of a touch screen device. The systems may include a processor and one or more stored sequences of instructions which, when executed by the processor, cause the processor to detect a touch event on a touch sensitive surface, generate a vibro-acoustic waveform signal using at least one sensor detecting such touch event, convert the waveform signal into at least a domain signal, extract distinguishing features from said domain signal, and classify said features to associate the features of the domain signal with a particular user.

The disclosed embodiments may include apparatus to differentiate touch screen users of a touch screen device. The apparatus may include a touch sensitive surface for detecting a touch event from at least one user, at least one sensor generating a vibro-acoustic waveform signal from such touch event, a converter for converting the waveform signal into at least a domain signal, a feature extractor for extracting distinguishing features from said domain signal, and a classification unit which uses the distinguishing features of said extractor to associate the features of the domain signal with a particular user.

The disclosed embodiments may include a machine-readable medium carrying one or more sequences of instructions for providing social information, which instructions, when executed by one or more processors, cause the one or more processors to detect a touch event on a touch sensitive surface, generate a vibro-acoustic waveform signal using at least one sensor detecting such touch event, convert the waveform signal into at least a domain signal, extract distinguishing features from said domain signal, and classify said features to associate the features of the domain signal with a particular user. The domain signal may be a time domain signal or a frequency domain signal.

In general, when a user touches a touch screen (i.e., a physical impact) of a computing system equipped with a touch screen (e.g., a smart phone), a mechanical force is applied to the touch screen, resulting in mechanical vibrations that propagate on and through the touch screen, as well as any contacting components (e.g., device chassis, electronics main board, enclosure). These mechanical vibrations may be captured by at least one of a variety of sensors, including impact sensors, vibration sensors, accelerometers, strain gauges, or acoustic sensors such as a condenser microphone, a piezoelectric microphone, MEMS microphone and the like.

Once the vibro-acoustic signal associated with the mechanical vibrations has been captured by a sensor, it can be converted into a series of features, for example: Average acoustic power, Standard Deviation, Variance, Skewness, Kurtosis, Absolute sum, Root Mean Square (RMS), Dispersion, Zero-crossings, Spectral centroid, Spectral density, Linear Prediction-based Cepstral Coefficients (LPCC), Perceptual Linear Prediction (PLP), Cepstral Coefficients Cepstrum Coefficients, Mel-Frequency Cepstral Coefficients (MFCC), Frequency phases (e.g., as generated by an FFT).

Many touch screen technologies are able to digitize several aspects of a touch event, such as the shape, size, capacitance, orientation, pressure, etc. The latter may be used as distinguishing features, or such features can be derived from them. Further, because human fingers vary in their anatomical composition, their acoustic and touch properties can vary between humans. Moreover, the way users touch a touch screen can also be distinguishing (e.g., what finger, what part of the finger, how flat, how hard). Thus, the vibro-acoustic features and touch features contain properties that can be characteristic of different users.

It is therefore possible to include a classifier in a computing system configured with a touch screen that upon receipt of a touch event, makes a determination about which user is operating the computing system or whether the user is authorized or has any personalized features. Any single event may not yield sufficient confidence as to identifying which user is operating the device. Therefore the classifier may withhold a conclusion until a sufficient level of confidence is reached, or a best guess can be forced at a predetermined period or event (e.g., after 10 touches, after 2 minutes, when entering a privileged application).

For some embodiments, the classifier may include a sensing system configured to continuously samples vibro-acoustic data and saving it into a buffer. The buffer can be of many lengths such as, for example, 50 milliseconds. The classifier may be coupled with a touch screen (or touch sensitive surface) configured to wait for a touch event to occur. Any number of touch technologies are possible for the touch screen. When the touch screen detects a touch event, it triggers a conversion, feature extraction, and classification process.

When the touch event is detected, data from the vibro-acoustic buffer is retrieved. Because the touch screen may have some latency, it is often necessary to look backwards in the buffer to find the vibro-acoustic waveform that corresponds to the touch impact (e.g., if the touch screen has a 20 ms latency, it may be necessary to look back in the buffer 20 ms to find the corresponding vibro-acoustic event). All or part of the buffer may be saved and passed to the next process.

The waveform from the sensor is a time-domain representation of the vibro-acoustic signal. During conversion, the signal is converted into other forms. This includes filtering the waveform and transforming into other forms, including frequency domain representations. During extraction, touch screen controller data and vibro-acoustic data are analyzed, and features that characterize different users are extracted. For the vibro-acoustic data, features are computed for all representations of the signal. These features are then passed to the classifier, which uses the information to label the touch event with a user (in addition to whatever the touch sensitive surface reports, e.g., X/Y position, major/minor axes, pressure, etc.) The augmented touch event may then be passed to the operating system (OS) or end user applications, to associate a user based on the touch event.

Figure 1:
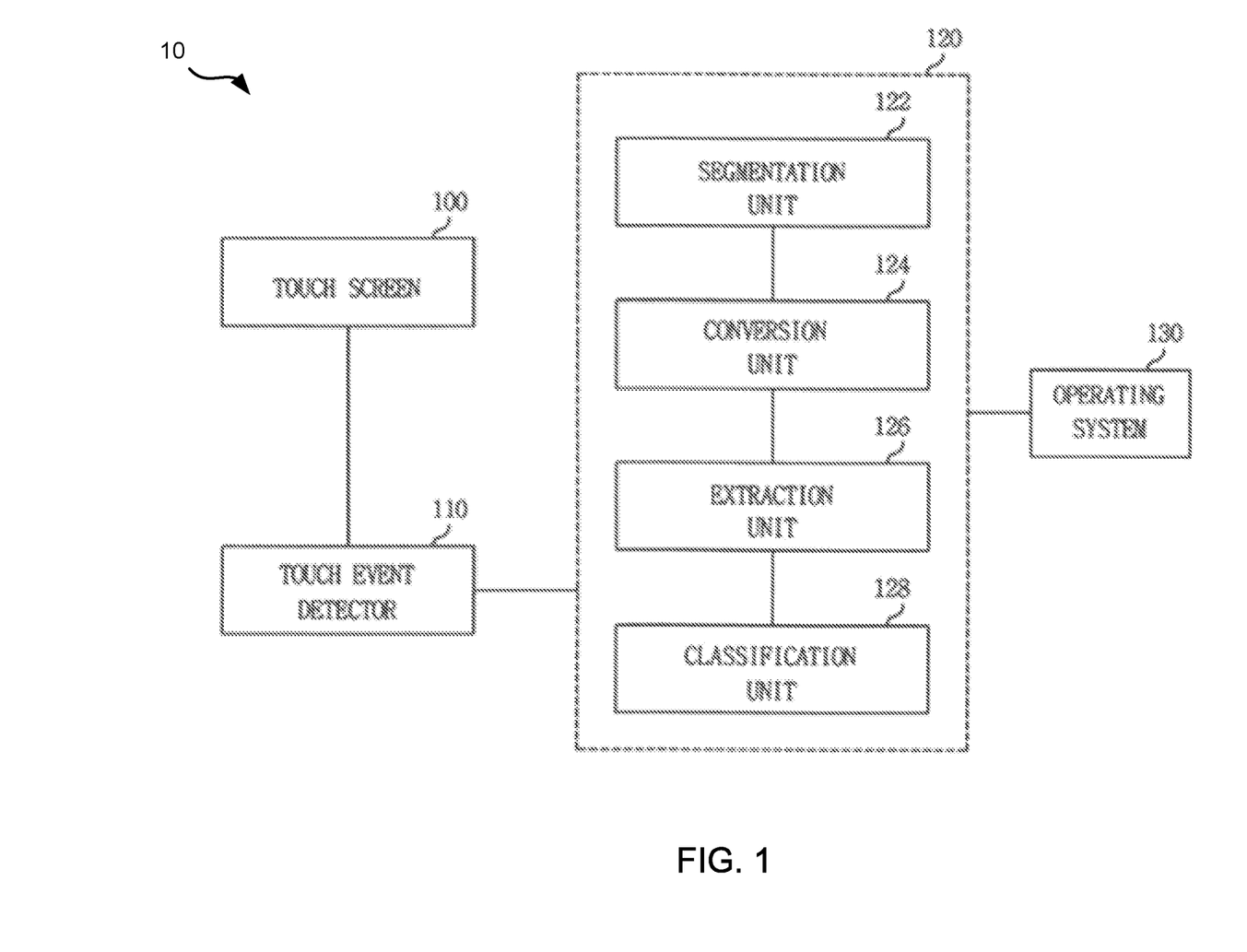
FIG. 1 is a block diagram of a computing system for distinguishing touch screen users based on a classification of vibro-acoustic signals, in accordance with an exemplary embodiment of the invention.

FIG. 1 is a block diagram of a computing system 10 for distinguishing among different users based on a classification of vibro-acoustic signals, in accordance with an embodiment of the invention. The computing system 10 of the embodiment may have an OS, and can run various types of services or applications, known as apps. The computing system 10 may also be equipped with a telecommunication capability that can allow connections to a communications network. Such a computing system may include, but not be limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 1, the computing system 10 may include a touch screen 100, a touch event detector 110, a vibro-acoustic classifier 120 and an OS 130. The touch event detector 110 may be associated with one or more sensors. The one or more sensors may be mounted at any number of locations inside the computing system 10, including but not limited to a chassis, touch screen, mainboard, PCB, display, panel and enclosure.

When a user uses a finger to touch a surface of the touch screen 100, the touch event produces a vibro-acoustic response in the air and also mechanical vibrations inside the contacting surface (e.g., touch screen, enclosure, device chassis). Some embodiments of the present invention may utilize both sources of vibro-acoustic signal with one or more sensors (e.g., one for in-air acoustics, and one for mechanical vibrations, also referred to as structural acoustics). Several sensor types can be used including, for example, Piezo bender elements, Piezo film, Accelerometers (e.g., linear variable differential transformer (LVDT), Potentiometric, Variable Reluctance, Piezoelectric, Piezoresistive, Capacitive, Servo (Force Balance), MEMS, Displacement sensors, Velocity sensors, Vibration sensors, Gyroscopes, Proximity Sensors, Electric mics, Hydrophones, Condenser microphone, Electret condenser microphone, Dynamic microphone, Ribbon microphone, Carbon microphone, Piezoelectric microphone, Fiber optic microphone, Laser microphone, Liquid microphone, MEMS microphone.

Many touch screen computing systems have microphones and accelerometers built in (e.g., for voice and input sensing). These can be utilized without the need for additional sensors, or can work in concert with specialized sensors.

The sensor may capture a waveform, which is a time-domain representation of the vibro-acoustic signal. The signal may be converted into other forms. This includes filtering the waveform (e.g., kalman filter, exponential moving average, 2 kHz high pass filter, one euro filter, savitzky-golay filter). It also includes transformation into other representations (e.g., wavelet transform, derivative), including frequency domain representations (e.g., spectral plot, periodogram, method of averaged periodograms, Fourier transform, least-squares spectral analysis, Welch's method, discrete cosine transform (DCT), fast folding algorithm).

The availability of the following touch features depends on the touch screen technology used. A classifier can use none, some or all of these features. These features may include location of touch contact (2D, or 3D in the case of curved glass or other non-planar geometry), size of touch contact (some touch technologies provide an ellipse of the touch contact with major and minor axes), rotation of the touch contact, surface area of the touch contact (e.g., in squared mm or pixels), pressure of touch (available on some touch systems), shear of touch ("shear stress (also called "tangential force" in the literature) arises from a force vector perpendicular to the surface normal of a touch screen. This may be similar to normal stress—what is commonly called pressure—which arises from a force vector parallel to the surface normal"), number of touch contacts, capacitance of touch (if using a capacitive touch screen), swept frequency capacitance of touch (if using a swept frequency6 capacitive touch screen), swept frequency impedance of touch (if using a swept frequency capacitive touch screen), shape of touch (some touch technologies can provide the actual shape of the touch, and not just a circle or ellipse), image of the hand pose (as imaged by e.g., an optical sensor, diffuse illuminated surface with camera, near-range capacitive sensing). It may be noted that the computation phase may also compute the derivative of one or more of the above features over a short period of time, for example, touch velocity and pressure velocity.

For some embodiments, the time domain and frequency domain representations of the signal, including 1st, 2nd and 3rd order derivatives of such representations may be used as features. For some embodiments, filtered versions of the time domain and frequency domain representations and the 1st, 2nd and 3rd order derivatives of such filtered versions may also be used as features.

The following features may be computed on time domain and frequency domain representations of the signal, including 1st, 2nd and 3rd order derivatives of such representations, and further, filtered versions of the time domain and frequency domain representations and the 1st, 2nd and 3rd order derivatives of such filtered versions: average, standard deviation, standard deviation (normalized by overall amplitude), variance, skewness, kurtosis, sum, absolute sum, root mean square (RMS), crest factor, dispersion, entropy, power sum, center of mass, coefficient of variation, cross correlation (i.e., sliding dot product), zero-crossings, seasonality (i.e., cyclic variation), and DC Bias. Template match scores for a set of known exemplar signals may be performed using the following methods: convolution, inverse filter matching technique, sum-squared difference (SSD), dynamic time warping, and elastic matching.

The following features may be computed on frequency domain representations, including 1st, 2nd and 3rd order derivatives of such representations, and further, filtered versions of the frequency domain representations and the 1st, 2nd and 3rd order derivatives of such filtered versions: spectral centroid, spectral density, spherical harmonics, total average spectral energy, band energy ratio (e.g., for every octave), log spectral band ratios (e.g., for every pair of octaves, and ever pair of thirds), additional vibro-acoustic features, linear prediction-based cepstral coefficients (LPCC), perceptual linear prediction (PLP), cepstral coefficients, cepstrum coefficients, mel-frequency cepstral coefficients (MFCC), and frequency phases (e.g., as generated by an FFT).

For some embodiments, all of the above features may be computed on the content of the entire buffer (e.g., 1 ms), and are also computed for sub regions (e.g., around the peak of the waveform, the end of the waveform). For some embodiments, all of the above vibro-acoustic features may be combined to form hybrid features such as, for example, a ratio (e.g., zero-crossings/spectral centroid) or difference (zero-crossings−spectral centroid).

The classification engine may use any number of approaches, including but not limited to basic heuristics, decision trees, Support Vector Machine, Random Forest, Naïve bayes, elastic matching, dynamic time warping, template matching, k-means clustering, K-nearest neighbors algorithm, neural network, Multilayer perceptron, multinomial logistic regression, Gaussian mixture models, and AdaBoost.

For some embodiments, it may be possible to combine results from several different classifiers, for example, through voting scheme. It may also be possible to use different classifiers based on one or more features. For example, two classifiers may be employed, one for processing sensor waveforms with a high Standard Deviation, and another classifier for waveforms with low Standard Deviation.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, including the conventional tip of the finger, causes the OS 130 to activate the application or service related to the interactive elements appropriate to the identified user. Fingers are diverse appendages, both in their motor capabilities and their anatomical compositions. Different users' fingers have different vibro-acoustic properties due to differences in bone density, fleshiness, skin quality, BMI and the like. A single digit contains different parts such as one or more knuckles, a tip, pad and fingernail. A user who tends to use the same finger part when activating a touch screen may add to the likelihood of a correct user identification.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail may encompass all parts of the keratin (or artificial nail material), horn-like envelope covering the dorsal aspect of the terminal phalanges of fingers. The knuckle may include the immediate areas surrounding the boney joints of human fingers, including joints on the thumb, and both major and minor knuckles. The boney regions may be within a 1 cm radius surrounding the metacarpophalangeal joints and interphalangeal articulations.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when one or more fingers touch or contact the surface of the touch screen 100, vibro-acoustic responses are produced. The vibro-acoustic characteristics of the respective user fingers and their respective unique anatomical characteristics produce unique responses for each user.

Referring back to FIG. 1, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone a piezoelectric microphone, MEMS microphone and the like. Once the vibro-acoustic signal has been captured by the touch event detector 110, the vibro-acoustic classifier 120 processes the vibro-acoustic signal to distinguish which user activated the touch screen.

The OS 130 runs the computing system so that the function can be activated in line with the classification of the vibro-acoustic signals and the corresponding user. The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify each user using the above-described features to distinguish among multiple users.

The segmentation unit 122 may be configured to sample the vibro-acoustic signal, for example, at a sampling rate of 96 kHz, using a sliding window of 4096 samples of the vibro-acoustic signal. The conversion unit 124 may be configured to perform, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may be configured to down-sample this data into additional vectors (i.e., buckets often), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may be configured to calculate a series of features from the frequency domain representation of the vibro-acoustic signals, such as the fundamental frequency of the impact waveform. The classification unit 128 may be configured to classify the vibro-acoustic signal using the features to distinguish what user generated the touch event, so that the computing system may selectively activate a function related to the identified user depending on the classified vibro-acoustic signals. To aid the classification operation, a user can provide supplemental training samples to the vibro-acoustic classifier 120. For some embodiments, the classification unit 128 may be implemented with a support vector machine (SVM) for feature classification. The SVM is a supervised learning model with associated learning algorithms that analyze data and recognize patterns, used for classification and regression analysis.

Figure 2A:
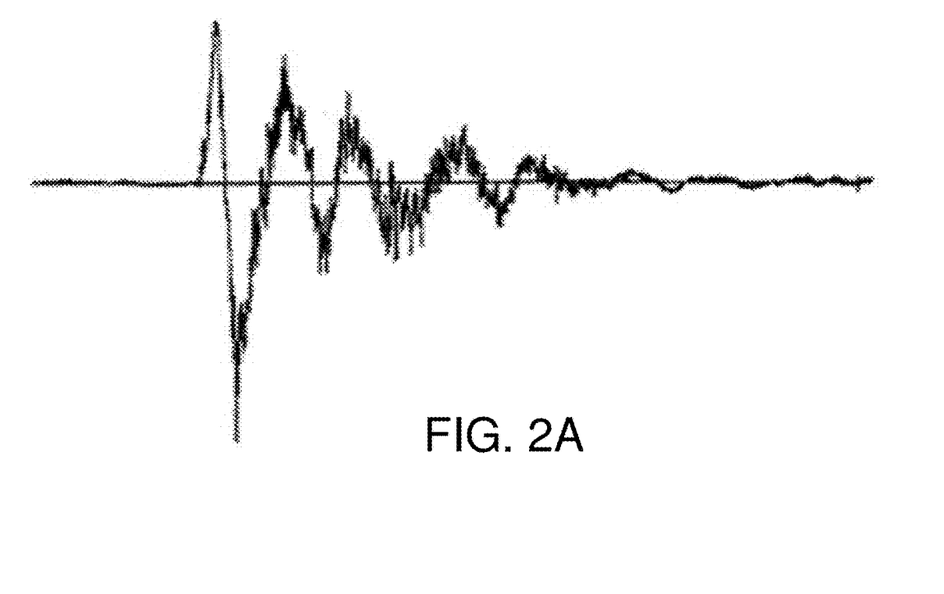
FIG. 2A is a graph of a waveform signal of a first user, showing a time domain signal generated by a touch screen event of the first user, in accordance with an exemplary embodiment of the invention.
Figure 2B:
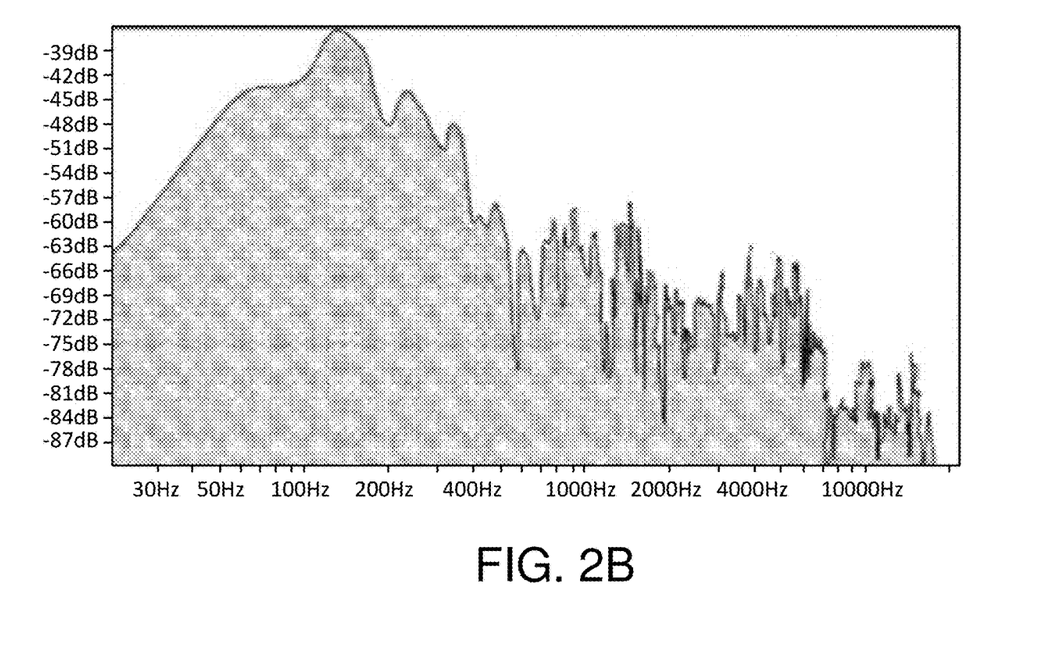
FIG. 2B is a converted waveform signal of the first user comprising the frequency spectrum of the waveform signal of FIG. 2A, in accordance with an exemplary embodiment of the invention.
Figure 3A:
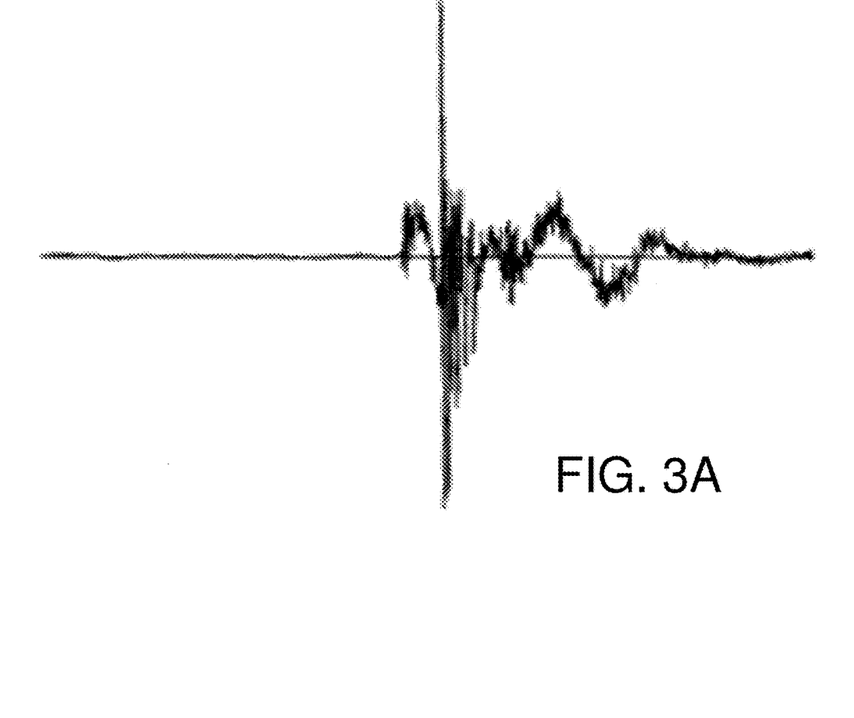
FIG. 3A is a graph of a waveform signal of a second user, showing a time domain signal generated by a touch screen event of the second user, in accordance with an exemplary embodiment of the invention.
Figure 3B:
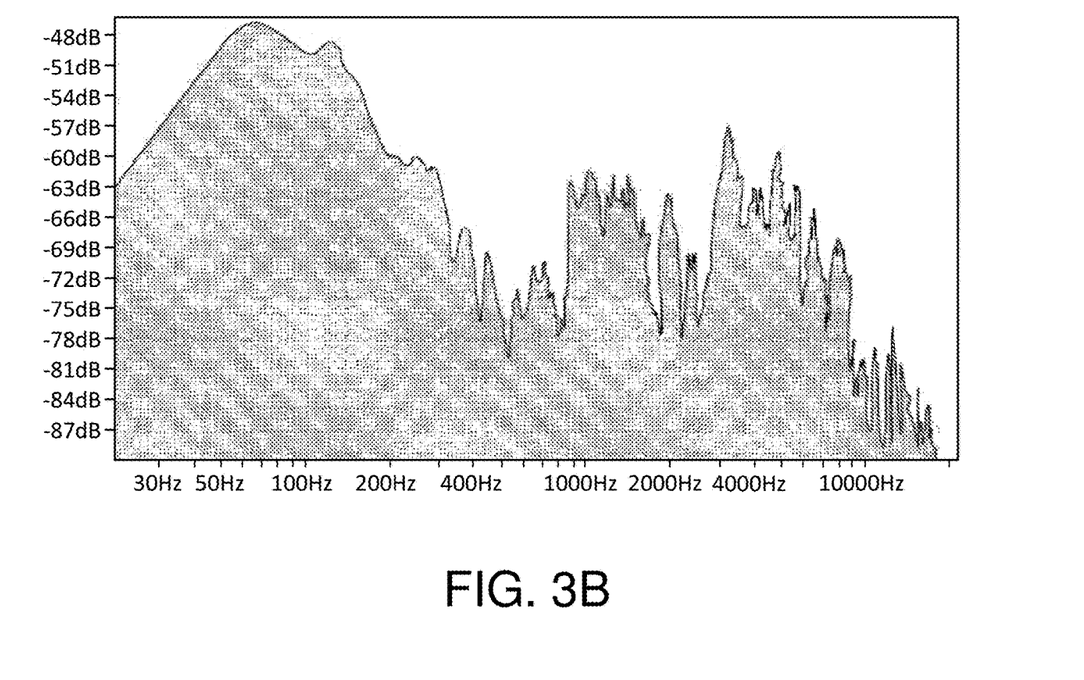
FIG. 3B is a converted waveform signal of the second user comprising the frequency spectrum of the waveform signal of FIG. 3A, in accordance with an exemplary embodiment of the invention.

FIGS. 2A and 2B illustrate an exemplary waveform signal and corresponding frequency spectrum of a touch event of a first user. FIGS. 3A and 3B illustrate an exemplary waveform signal and corresponding frequency spectrum of a touch event of a second user, different from the first user. The differences in waveforms associated with the first user and with the second user as illustrated in FIGS. 2A and 2B versus FIGS. 3A and 3B are typical for different users activating a touch screen in different impact actions.

Figure 4:
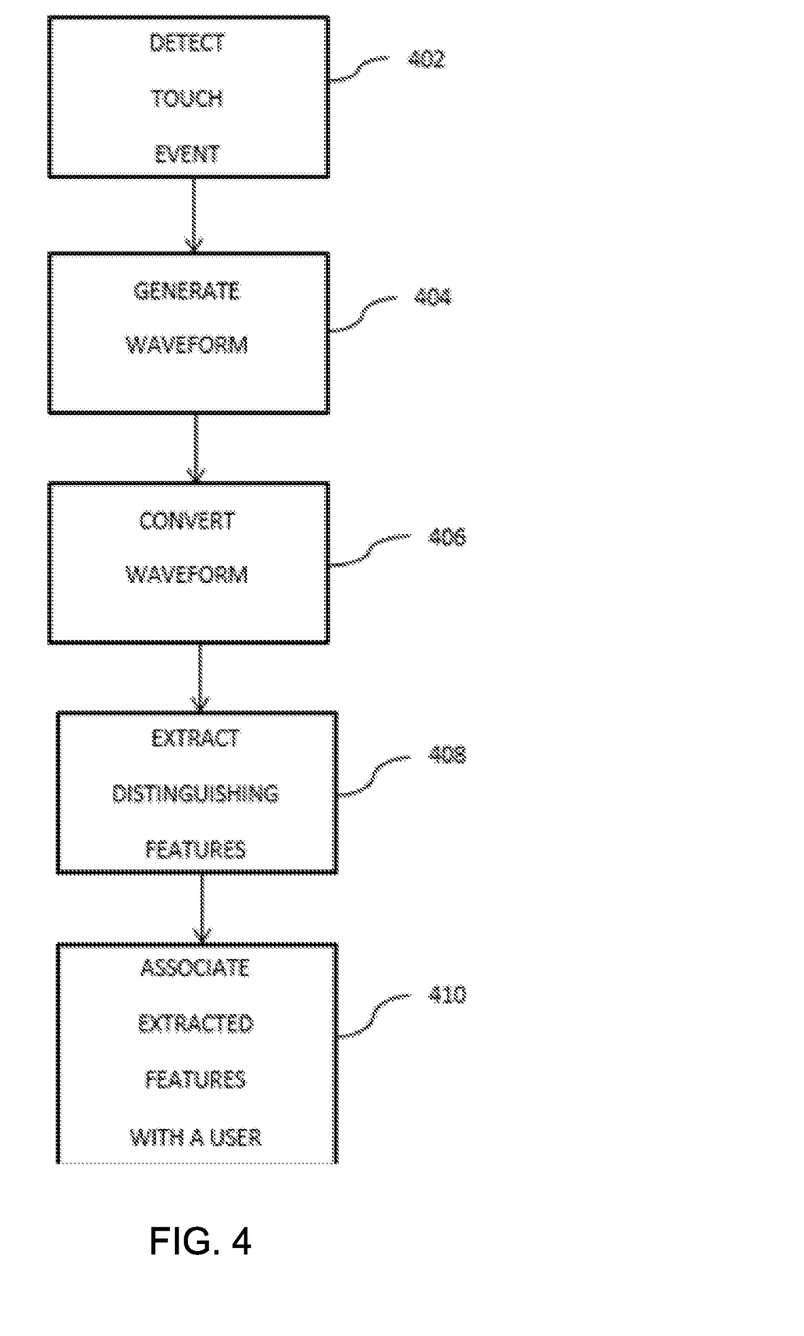
FIG. 4 is a flow diagram illustrating a process that may be performed to differentiate touch screen users, in accordance with an exemplary embodiment of the invention.

FIG. 4 is a flow diagram illustrating a process that may be performed to differentiate touch screen users, in accordance with an exemplary embodiment of the invention. As shown in block 402, when a user touches a touch screen, a touch event is detected. The touch event entailing the vibro-acoustic signal. At block 404, a waveform is generated based on detection of the touch event in block 402. At block 406, the waveform generated in block 404 is converted into another form. At block 408, distinguishing features are extracted. At block 410, the extracted features are associated with a particular user. In a common architecture, the data storage in which the algorithm for executing or assisting with execution of the operations shown in FIG. 4 includes a machine-readable medium which stores the main body of instructions (e.g., software). The instructions may also reside, completely or at least partially, within a memory or within a processor (e.g., within a processor's cache memory) of a host device (e.g. a cell phone, kiosk, or a laptop computer) during execution. The memory and the processor also constitute machine-readable media.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. An apparatus for differentiating touch screen users based on characterization of features derived from touch event acoustics and mechanical impact, the apparatus comprising:
   a touch sensitive surface for detecting a touch event from at least one user;
   at least one sensor for generating a waveform signal in response to the touch event;
   a converter for converting the waveform signal into at least a domain signal;
   a feature extractor for extracting distinguishing features from the domain signal; and
   a classification unit for employing the distinguishing features of the feature extractor to associate the distinguishing features of the domain signal with touch feature properties for a particular user.

2. The apparatus recited in claim 1, wherein the at least one sensor comprises a senor for detecting an acoustic effect of the touch event.

3. The apparatus recited in claim 1, wherein the at least one sensor comprises a senor for detecting a mechanical impact effect of the touch event.

4. The apparatus recited in claim 1, wherein the domain signal is a time domain signal.

5. The apparatus recited in claim 1, wherein the domain signal is a frequency domain signal.

6. The apparatus recited in claim 1, wherein the distinguishing features depend at least in part on physical characteristics of a finger used to create the touch event.

7. The apparatus recited in claim 1, wherein the distinguishing features depend at least in part on the magnitude of an impact used to create the touch event.

8. The apparatus recited in claim 1, wherein the at least one sensor comprises a sensor for detecting vibrations initiated by the touch event.

9. The apparatus recited in claim 1, wherein the at least one sensor comprises a sensor taken from a group of sensors consisting of impact sensors, vibration sensors, accelerometers, strain gauges, piezo-electric devices and acoustic sensors.

10. The apparatus recited in claim 1, wherein the distinguishing features are extracted based on at least one computation of a characteristic taken from a group consisting of average, standard deviation, variance, skewness, kurtosis, sum, root mean square, crest factor, dispersion, entropy, power sum, center of mass, coefficient of variation, cross-correlation, zero-crossings, seasonality, direct current bias, spectral centroid, spectral density, spherical harmonics, spectral energy, band energy ratio, by spectral band ratios, cepstral coefficients and fast Fourier transform content.

11. A computer-implemented method for differentiating touch screen users based on characterization of features derived from touch event acoustics and mechanical impact, the computer-implemented method comprising the following steps:
   detecting a touch event on a touch sensitive surface;
   generating a waveform signal using at least one sensor detecting the touch event;
   converting the waveform signal into at least a domain signal;
   extracting distinguishing features from the domain signal; and
   employing the distinguishing features to associate the distinguishing features of the domain signal with touch feature properties for a particular user.

12. The computer-implemented method recited in claim 11, wherein the generating comprises using the at least one sensor for detecting an acoustic effect of a touch event.

13. The computer-implemented method recited in claim 11, wherein the generating comprises using the at least one sensor for detecting a mechanical impact effect of the touch event.

14. The computer-implemented method recited in claim 11, wherein the converting comprises converting the waveform signal into a time domain signal.

15. The computer-implemented method recited in claim 11, wherein the converting comprises converting the waveform signal into a frequency domain signal.

16. The computer-implemented method recited in claim 11, wherein the extracting comprises determining at least a portion of the distinguishing features based at least in part on physical characteristics of a finger used to create the touch event.

17. The computer-implemented method recited in claim 11, wherein the extracting comprises determining at least a portion of the distinguishing features based at least in part on magnitude of an impact used to create the touch event.

18. The computer-implemented method recited in claim 11, wherein the generating comprises using the at least one sensor to detect vibrations initiated by the touch event.

19. The computer-implemented method recited in claim 11, wherein the at least one sensor comprises a sensor taken from a group of sensors consisting of impact sensors, vibration sensors, accelerometers, strain gauges, piezo-electric devices and acoustic sensors.

20. The computer-implemented method recited in claim 11, wherein the distinguishing features are extracted based on at least one computation of a characteristic taken from a group consisting of average, standard, deviation, variance, skewness, kurtosis, sum, root mean square, crest factor, dispersion, entropy, power sum, center of mass, coefficient variation, cross-correlation, zero-crossings, seasonality, direct current bias, spectral centroid, spectral density, spherical harmonics, spectral energy, band energy ratio, log spectral band ratios, cepstral coefficients and fast Fourier transform content.

21. A non-transitory computer readable medium containing program instructions for using detected touch screen events to associate particular users with the detected touch screen events, wherein execution of the program instructions by a processor causes the processor to carry out the steps of:
    generating a waveform signal using at least one sensor detecting a touch event;
    converting the waveform signal into at least a domain signal;
    extracting distinguishing features from the domain signal; and
    employing the distinguishing features to associate the distinguishing features of the domain signal with touch feature properties for a particular user.

22. The non-transitory computer readable medium of claim 21, wherein the generating comprises using the at least one sensor for detecting an acoustic effect of the touch event.

23. The non-transitory computer readable medium of claim 21, wherein the generating comprises using the at least one sensor for detecting a mechanical impact effect of the touch event.

24. The non-transitory computer readable medium of claim 21, wherein the converting comprises converting the waveform signal into a time domain signal.

25. The non-transitory computer readable medium of claim 21, wherein the converting comprises converting the waveform signal into a frequency domain signal.

26. The non-transitory computer readable medium of claim 21, wherein the extracting comprises determining at least a portion of the distinguishing features based at least in part on physical characteristics of a finger used to create the touch event.

27. The non-transitory computer readable medium of claim 21, wherein the extracting comprises determining at least a portion of the distinguishing features based at least in part on magnitude of an impact used to create the touch event.

28. The non-transitory computer readable medium of claim 21, wherein the generating comprises using the at least one sensor to detect vibrations initiated by the touch event.

29. The non-transitory computer readable medium of claim 21, wherein the at least one sensor comprises a sensor taken from a group of sensors consisting of impact sensors, vibration sensors, accelerometers, strain gauges, piezo-electric devices and acoustic sensors.

* * * * *